United States Patent
Cheng (10) Patent No.: US 7,996,041 B2
(45) Date of Patent: Aug. 9, 2011

(54) APPARATUS AND METHOD FOR REQUESTING INITIATION OF A COMMUNICATION SESSION USING CAPABILITY CONFIGURATION PARAMETERS WITH CARD APPLICATION TOOLKIT

(75) Inventor: Yi Cheng, San Diego, CA (US)

(73) Assignee: Nokia Corporation, Espoo (FI)

( * ) Notice: Subject to any disclaimer, the term of this patent is extended or adjusted under 35 U.S.C. 154(b) by 1343 days.

(21) Appl. No.: 11/279,304

(22) Filed: Apr. 11, 2006

(65) Prior Publication Data

US 2006/0234760 A1 Oct. 19, 2006

Related U.S. Application Data

(60) Provisional application No. 60/671,644, filed on Apr. 15, 2005.

(51) Int. Cl.
*H04B 1/38* (2006.01)
*H04M 1/00* (2006.01)
(52) U.S. Cl. ............... 455/558; 455/438; 455/456.6
(58) Field of Classification Search .......... 455/558, 455/425, 432.3, 435.2, 438, 456.6, 466
See application file for complete search history.

(56) References Cited

U.S. PATENT DOCUMENTS

| 6,321,085 | B1 | 11/2001 | Achour et al. | |
|---|---|---|---|---|
| 6,978,157 | B1 * | 12/2005 | Amiens | 455/558 |
| 2001/0001089 | A1 * | 5/2001 | Krishnamurthi et al. | 455/414 |
| 2001/0053693 | A1 * | 12/2001 | Achour et al. | 455/432 |
| 2002/0037710 | A1 * | 3/2002 | Park | 455/414 |
| 2002/0082051 | A1 | 6/2002 | Tangorra et al. | |
| 2002/0176382 | A1 * | 11/2002 | Madour et al. | 370/331 |
| 2004/0029606 | A1 | 2/2004 | Tiedemann, Jr. et al. | |
| 2004/0043788 | A1 | 3/2004 | Mittal | |
| 2004/0076131 | A1 * | 4/2004 | Qu et al. | 370/335 |
| 2005/0032519 | A1 * | 2/2005 | Olson | 455/444 |
| 2005/0164726 | A1 * | 7/2005 | Yeo | 455/518 |

FOREIGN PATENT DOCUMENTS

| EP | 0998059 | | 5/2000 |
|---|---|---|---|
| GB | 2315387 | A | 1/1998 |
| JP | 2000-184462 | | 6/2000 |
| WO | WO 01/31967 | | 5/2001 |
| WO | WO 2001/031953 | | 5/2001 |
| WO | WO 0131953 | A1 * | 5/2001 |
| WO | WO 02/052876 | | 7/2002 |

OTHER PUBLICATIONS

Singapore Search Report and Written Opinion dated Jun. 18, 2009, Singapore Application No. 200706794-5, filed Apr. 12, 2006.

(Continued)

*Primary Examiner* — Tuan A Pham
(74) *Attorney, Agent, or Firm* — Alston & Bird LLP (57) ABSTRACT

A means by which a list of service options may be used as capability configuration parameters to specify a card application toolkit call setup command, such as from R-UIM applications, is provided. For example, when the R-UIM application sends a call setup command to a mobile communication station, the R-UIM application may also send a list of service options that may be used by the mobile communication station to negotiate with the network. During the service negotiation process of setting up the call, the mobile communication station will only use or accept a service option that is in the service option list.

9 Claims, 3 Drawing Sheets

OTHER PUBLICATIONS

Office Action dated Sep. 28, 2009 of corresponding Korean Application No. 10-2007-7026002, filed Apr. 12, 2006.
Office Action dated Mar. 15, 2010 of corresponding Korean Application No. 10-2007-7026002, filed Apr. 12, 2006.
English translation of Office Action dated May 7, 2010 of corresponding Chinese Application No. 200680014553.6, filed Apr. 12, 2006.
Office Action dated May 7, 2010 of corresponding Chinese Application No. 200680014553.6, filed Apr. 12, 2006.
English translation of Office Action dated Jul. 20, 2010 of corresponding Japanese Application No. 2008-505978, filed Apr. 12, 2006.
Office Action dated Jul. 20, 2010 of corresponding Japanese Application No. 2008-505978, filed Apr. 12, 2006.
English translation of Office Action dated Aug. 3, 2010 of corresponding Korean Patent Application No. 2007-7026002, filed Apr. 12, 2006.
Office Action dated Aug. 3, 2010 of corresponding Korean Patent Application No. 2007-7026002, filed Apr. 12, 2006.
English translation of Office Action dated Mar. 30, 2010 of Corresponding Chinese Application No. 200680014553.6.
Office Action dated Mar. 30, 2010 of corresponding Chinese Application No. 200680014553.6.

* cited by examiner

APPARATUS AND METHOD FOR REQUESTING INITIATION OF A COMMUNICATION SESSION USING CAPABILITY CONFIGURATION PARAMETERS WITH CARD APPLICATION TOOLKIT

CROSS-REFERENCE TO RELATED APPLICATIONS

This application claims the benefit of U.S. Provisional Application No. 60/671,644, filed Apr. 15, 2005, which is incorporated by reference herein in its entirety.

FIELD

Embodiments of the invention generally relate to wireless communication, and more particularly to systems, terminals, and methods for enhancing communication between removable user identity modules and corresponding mobile communication terminals.

BACKGROUND

Wireless communication devices, such as cellular or mobile telephones and other devices capable of wireless communication, are widely used throughout the world. Single mode communication devices are typically designed to communicate with one type of wireless communication network. Examples of wireless communications networks include GSM (Global Systems for Mobile Communication), WCDMA (Wideband Code Division Multiple Access), and CDMA (Code Division Multiple Access). GSM networks are more commonly used in Europe and CDMA networks are more commonly used in the United States. CDMA systems operate by dividing a radio spectrum to be shared by multiple users through the assignment of unique codes. CDMA systems assign a unique code to each signal that is to be transmitted, and are thereby able to spread many simultaneous signals across a wideband spread spectrum bandwidth. Using the respective codes, the signals can then be detected and isolated from the other signals that are being transmitted over the same bandwidth.

The functionality of mobile telephones is steadily increasing, as new and improved features are offered in new mobile telephones. However, these new features may not be available to mobile telephone users unless the user purchases a new mobile telephone. Additionally, some features may be specialized and therefore desired only by a small percentage of mobile telephone users. Because of the limited demand, such specialized features may not be offered by a mobile telephone manufacturer as a standard feature in the manufacturer's mobile telephones. A solution that has been developed to enable mobile service providers and third parties to offer unique and specialized software applications is a removable user identity module (R-UIM). An R-UIM is a smart card that may contain user information, data features, and software applications. The R-UIM may be inserted in any mobile telephone capable of interfacing with an R-UIM, and may be transferred from one mobile telephone to another. A mobile telephone user may obtain specialized software applications that are stored on and execute from the R-UIM. The mobile telephone user may obtain such applications directly from the service provider or from the third party developer. For example, a third party may offer an application on an R-UIM that provides call-forwarding functionality for mobile telephones that do not already have that functionality.

The CDMA Card Application Toolkit (CCAT) is a standardized set of commands and procedures that enables applications that are stored on an R-UIM to interact with and operate any mobile telephone (also termed mobile equipment (ME) or mobile communication station) which is capable of accepting R-UIMs and supporting the CCAT. The CCAT enables applications on the R-UIM to function on any particular manufacturer's mobile telephone that supports the CCAT features.

In the command set of the CCAT, there are commands that enable the R-UIM to have the mobile telephone display text, play a defined sound, send an SMS (short message service) message, or initiate a telephone call (or other type of communication session), to list just a few examples. The CCAT specifies a CALL SETUP command to enable an application executing from the R-UIM to initiate a telephone call from the mobile telephone to the network (such a call is termed a mobile-originated (MO) call).

Capability configuration parameters are the bearer capability parameters or configuration that may be used by the CDMA physical layer or the multiplex sub-layer to enable call setup. The capability configuration parameters define, for example, the data rate, encoding/decoding, and sampling that will be used for communication between the mobile telephone and the network. Different call types (e.g., voice or data) typically require different capability configuration parameters.

Current CDMA specifications support the concept of service options on both the control and the traffic channels. Service options allow various voice and non-voice services to be defined independently within the confines of the physical layer and the multiplex sub-layer interface. Each service option defines the configuration and parameters used in physical layer and multiplex sub-layer for a specific call type. Approximately 50 service options have been defined for CDMA to date. These defined service options are used for negotiation between a mobile telephone and a network. Every time a mobile telephone connects to a network, the mobile telephone and the network must negotiate and agree on a service option to use for communication during that connection. The service options are defined in *Administration of Parameter Value Assignments for cdma2000 Spread Spectrum Standards—Release D* (3GPP2 C.R1001-D, V1.0, Apr. 18, 2003). For example, service option 1 defines a basic variable rate voice service with a communication speed of 8 kbps, while service option 15 defines a packet data service with a communication speed of 14.4 kbps. Each service option is identified by a two byte (16 bit) service option binary number The current CCAT specification does not specify CDMA capability configuration parameters. As such, when a CALL SETUP command from R-UIM is received by a mobile telephone, the mobile telephone is only capable of using the default configuration parameters for the physical and multiplex layers. Because only the default configuration parameters can be used, the types of telephone calls that can be initiated by CCAT applications executing from an R-UIM is limited to only speech calls. Data calls cannot be initiated by CCAT applications executing from an R-UIM, therefore the functionality of CCAT applications is limited. Furthermore, the CDMA2000 specification specifies a procedure for a mobile telephone and a mobile network to negotiate a mutually acceptable physical and multiplex layer configuration and mutually acceptable parameters. However, as the current CCAT specification does not specify capability configuration parameters, as discussed above, a CCAT application executing from an R-UIM is not able to negotiate physical and multiplex layer configuration and parameters with the mobile network and only the default configuration can be used by the CCAT CALL SETUP command.

As such, there is a need to expand the CALL SETUP function of CCAT applications to enable different call types, such as circuit data or packet data. Additionally, there is a need to enable the card application toolkit applications, such as a CCAT application, to negotiate a physical and multiplex layer configuration and parameters with the mobile network.

BRIEF SUMMARY

Generally described, embodiments of the invention provide an improvement over the known prior art by providing a means by which a list of service options may be used as capability configuration parameters for a call setup command, such as from R-UIM applications. For example, when the R-UIM application sends a call setup command to a mobile communication station, the R-UIM application may also send a list of service options that may be used by the mobile communication station to negotiate with the network. During the service negotiation process of setting up the call, the mobile communication station will only use or accept a service option that is in the service option list.

In this regard, an apparatus for requesting initiation of a communication session, such as a telephone call, comprises a processing element configured to receive a call setup command requesting initiation of a communication session, and to receive an ordered list of service options, each service option defining one acceptable configuration of the requested communication session. The processing element may be further configured to negotiate with a wireless network to initiate the requested communication session, such that the processing element proposes to the wireless network a service option from the ordered list. The call setup command and the ordered list may be received from a removable user identity module (R-UIM).

The processing element may be further configured to initiate the requested communication session if the wireless network accepts the proposed service option, or if a counter-proposed service option from the wireless network is contained within the ordered list.

The processing element may be further configured to terminate communication between the processing element and the wireless network if the processing element and the wireless network cannot agree on a service option contained within the ordered list.

The apparatus may be embodied in a mobile telephone. The call setup command may conform to a Code Division Multiple Access Card Application Toolkit standard.

In addition to the apparatus for requesting initiation of a communication session described above, other aspects of embodiments of the invention are directed to corresponding methods for requesting initiation of a communication session.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
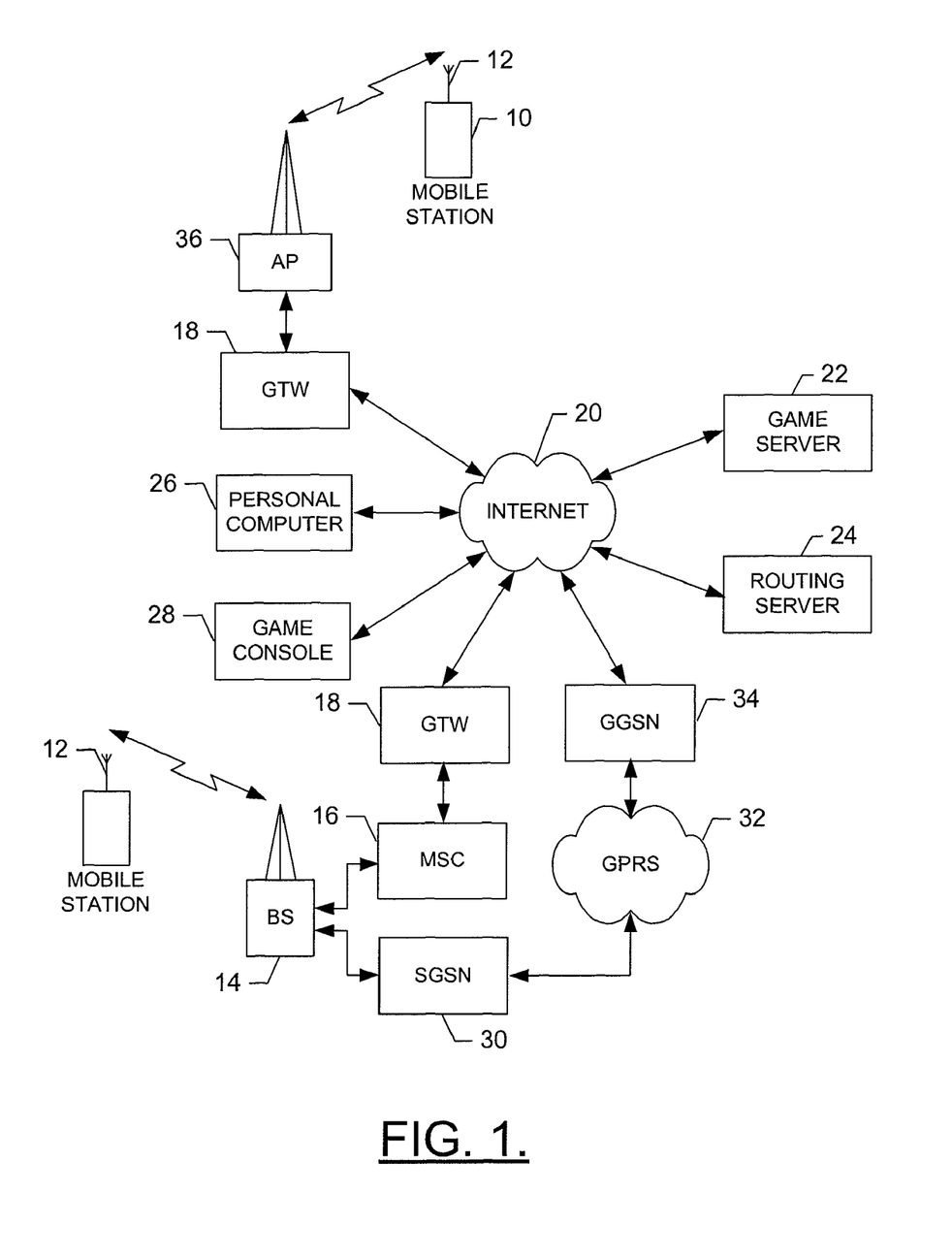
FIG. 1 is a schematic block diagram of one type of system that would benefit from embodiments of the invention.

Referring to FIG. 1, an illustration of one type of system that would benefit from the present invention is provided. The system can include one or more mobile stations 10, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from mobile stations when those mobile stations are making and receiving calls, data or the like. The MSC can also provide a connection to landline trunks when mobile stations are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a gateway (GTW) 18, and the GTW is coupled to a WAN, such as the Internet 20. In turn, devices such as processing elements (e.g., personal computers, server computers or the like) can be coupled to the mobile station 10 via the Internet. For example, as explained below, the processing elements can include one or more processing elements associated with one or more game servers 22, routing servers 24, personal computer (PC) systems 26, game consoles 28, or the like, one of each being illustrated in FIG. 1 and described below. As will be appreciated, the processing elements can comprise any of a number of processing devices, systems or the like capable of operating in accordance with embodiments of the invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the mobile station 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more mobile stations may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode mobile stations (e.g., digital/analog or TDMA/CDMA/analog phones).

While the system of FIG. 1 is capable of supporting communications with mobile stations using a number of different communication protocols, it is mobile stations communicating in accordance with the CDMA protocol that will be described below in conjunction with exemplary embodiments of the present invention.

One or more mobile stations 10 can further be coupled to one or more wireless access points (APs) 36. The APs can be configured to communicate with the mobile station in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 14, the APs can be directly coupled to the Internet. In one embodiment, however, the APs are indirectly coupled to the Internet via a GTW 18. As will be appreciated, by directly or indirectly connecting the mobile stations and the user processors (e.g., game servers 22, routing servers 24, personal computer (PC) systems 26, game consoles 28, and network entities) and/or any of a number of other devices to the Internet, whether via the APs or the mobile network(s), the mobile stations and user processors can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the invention. Thus, use of any such terms should not be taken to limit the spirit and scope of the embodiments of the invention.

Figure 2:
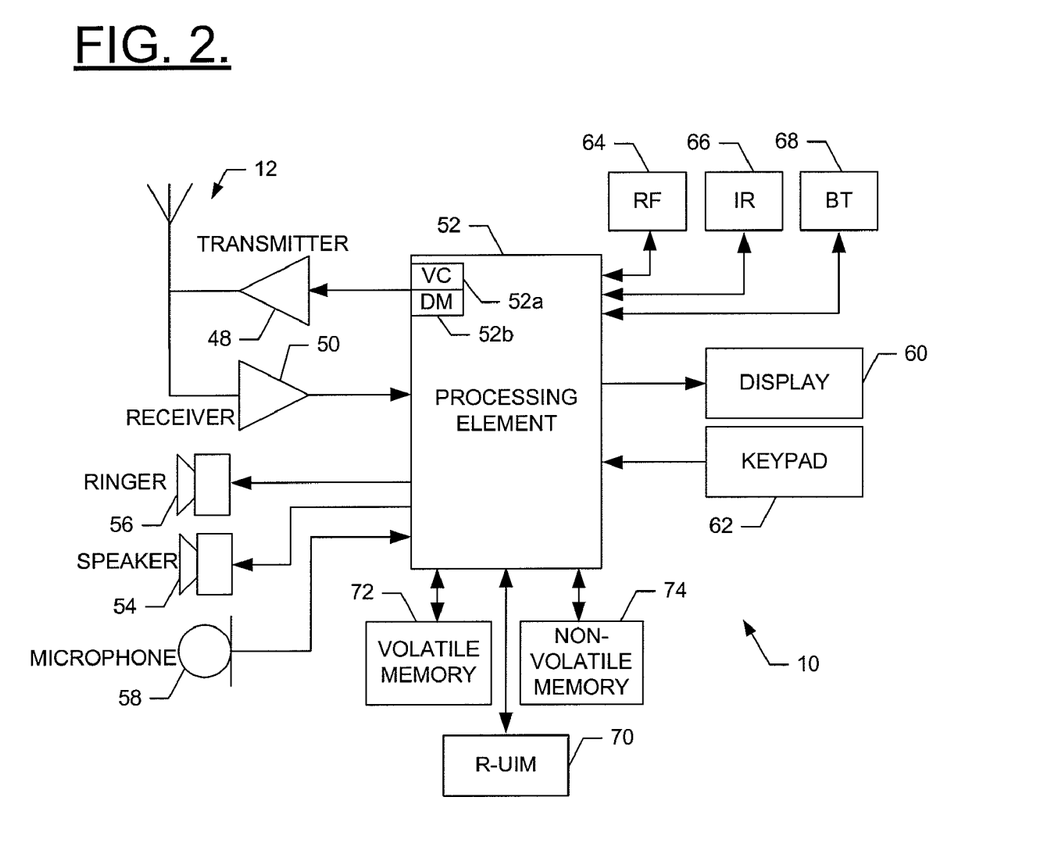
FIG. 2 is a schematic block diagram more particularly illustrating a mobile station in accordance with one embodiment of the invention.

Reference is now made to FIG. 2, which illustrates one type of mobile station 10, a mobile telephone, which would benefit from embodiments of the present invention. It should be understood, however, that the mobile station illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers, mobile gaming devices and other types of electronic systems, can readily employ the invention.

As shown, in addition to an antenna 12, the mobile station 10 can include a transmitter 48, receiver 50, and processing element 52 or other processor that provides signals to and receives signals from the transmitter and receiver, respectively. These signals include signaling information in accordance with the air interface standard of the applicable cellular system, and also user speech and/or user generated data. In this regard, the mobile station can be capable of operating in accordance with the CDMA communication protocol.

It is understood that the processing element 52 includes the circuitry required for implementing the audio and logic functions of the mobile station 10. For example, the processing element may be comprised of a digital signal processor device, a microprocessor device, and various analog-to-digital converters, digital-to-analog converters, and other support circuits. The control and signal processing functions of the mobile station are allocated between these devices according to their respective capabilities. The processing element can additionally include an internal voice coder (VC) 52a, and may include an internal data modem (DM) 52b. Further, the processing element may include the functionality to operate one or more client software programs such as those indicated above, which may be stored in memory (described below).

The mobile station 10 also comprises a user interface including a conventional earphone or speaker 54, a ringer 56, a microphone 58, a display 60, and a user input interface, all of which are coupled to the processing element 52. Although not shown, the mobile station can include a battery for powering the various circuits that are required to operate the mobile station, as well as optionally providing mechanical vibration as a detectable output. The user input interface, which allows the mobile station to receive data, can comprise any of a number of devices allowing the mobile station to receive data, such as a keypad 62, a touch display (not shown), a joystick (not shown) or other input device. In embodiments including a keypad, the keypad includes the conventional numeric (0-9) and related keys (#, *), and other keys used for operating the mobile station.

The mobile station 10 can also include one or more means for sharing and/or obtaining data. For example, the mobile station can include a short-range radio frequency (RF) transceiver or interrogator 64 so that data can be shared with and/or obtained from electronic devices in accordance with RF techniques. The mobile station can additionally, or alternatively, include other short-range transceivers, such as, for example an infrared (IR) transceiver 66, and/or a Bluetooth (BT) transceiver 68 operating using Bluetooth brand wireless technology developed by the Bluetooth Special Interest Group. The mobile station can therefore additionally or alternatively be capable of transmitting data to and/or receiving data from electronic devices in accordance with such techniques. Although not shown, the mobile station can additionally or alternatively be capable of transmitting and/or receiving data from electronic devices according to a number of different wireless networking techniques, including WLAN techniques such as IEEE 802.11x techniques or the like.

The mobile station 10 further includes memory, such as a removable user identity module (R-UIM) 70, which typically stores information elements related to a mobile subscriber. In addition to the R-UIM, the mobile station can include other removable and/or fixed memory. In this regard, the mobile station can include volatile memory 72, such as volatile Random Access Memory (RAM) including a cache area for the temporary storage of data. The mobile station can also include other non-volatile memory 74, which can be embedded and/or may be removable. The non-volatile memory can additionally or alternatively comprise an EEPROM, flash memory or the like. The memories can store any of a number of software applications, instructions, pieces of information, and data, used by the mobile station to implement the functions of the mobile station.

Figure 3:
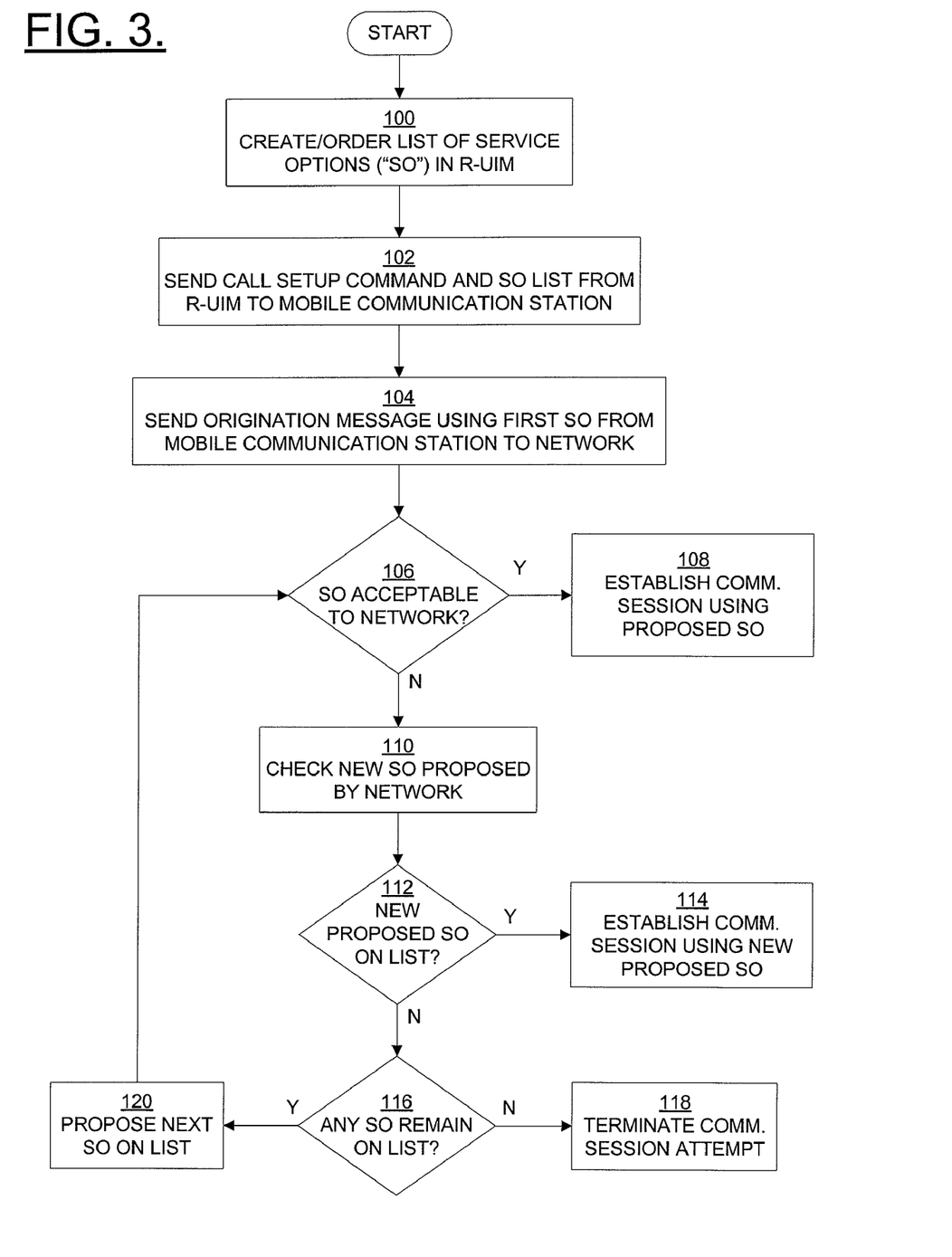
FIG. 3 is a flowchart illustrating the use of capability configuration parameters with a card application toolkit call setup command, in accordance with one embodiment of the invention.

Reference is now made to FIG. 3, which illustrates the use of capability communication parameters, such as CDMA capability configuration parameters, with a call setup command of a card application toolkit (CAT), such as a CDMA Card Application Toolkit (CCAT) CALL SETUP command, in accordance with one embodiment of the present invention. As discussed above, an R-UIM in a mobile telephone (or other type of mobile communication station) may contain an application that will use the CAT commands to interact with and operate the mobile telephone. In particular, the R-UIM application, such as a call-forwarding application, may use the call setup command to cause the mobile telephone to initiate a telephone call or other type of communication session to the network. In embodiments of the present invention, the R-UIM application will create a list of service options ("SO"), such as CDMA service options, that may be used as the capability configuration parameters in the call setup command from the R-UIM application. See block 100. The list of service options will typically comprise a plurality of service options, with each service option capable of supporting the type of call the R-UIM is attempting to initiate. For example, if the R-UIM application is attempting to initiate a data call (i.e., a call in which data will be transferred across the network to and/or from the mobile telephone), the list of service options created will typically comprise some or all the service options capable of supporting a data call. For example, the list may contain two service options, SO 16 and SO 8, wherein both service options are for a cellular digital packet data (CDPD) call, but SO 16 will use a data rate of 14.4 kbps while SO 8 use a data rate of 9.6 kbps. Alternatively, if the R-UIM application is attempting to initiate a voice call, the list of service options created will typically comprise some or all the service options capable of supporting a voice call. For example, the list can contain two service options, SO 3 and SO 1, wherein SO 3 will use enhanced variable rate voice codec and SO 1 will use basic variable rate voice codec. The R-UIM application will typically order the list of service options according to the preferability of each service option, such that the most preferable service option is listed first and the least preferable (but still appropriate) service option is listed last.

The ordered list of service options is sent from the R-UIM application to the mobile telephone when the call setup command is sent. See block 102. The list is sent as the capability configuration parameters. The length of the capability configuration parameters will vary depending on the number of service options in the list. In one embodiment, the first byte of the capability configuration parameters is a tag indicating that capability configuration parameters are being transmitted. The next one or more bytes of the capability configuration parameters of this embodiment indicates the length, in bytes, of the capability configuration parameters being sent. The remaining bytes of the capability configuration parameters are a series of two byte indicators for the service options, in the order of preference. This is indicated in Table 1.

TABLE 1

| Byte(s) | Description | Length |
|---|---|---|
| 1 | Capability Configuration Parameters tag | 1 |
| 2 to (Y − 1) + 2 | Length (X) | Y |
| (Y − 1) + 3 to (Y − 1) + X + 2 | Capability Configuration Parameters listing service options | X |

For example, capability configuration parameters containing a list of four service options would typically contain ten bytes: one byte for the tag, one byte for the length, and eight bytes for the service options (two bytes for each of the four service options).

The list of service options may be used by the mobile telephone to negotiate with the network for a mutually acceptable service option. During the service negotiation process of setting up the call, the mobile telephone will only use or accept a service option that is in the service option list. When the mobile telephone receives the CAT call setup command, such as a CCAT CALL SETUP command, with a capability configuration parameters tag included, the mobile telephone will generally use the first service option that is listed in the capability configuration parameters as the service option field in an origination message, such as a CDMA origination message, that is transmitted from the mobile telephone to the network. See block 104.

If this first proposed service option is acceptable to the network, as determined in block 106, the network will acknowledge acceptance to the mobile telephone and a call will be established using the first proposed service option. See block 108. If the first proposed service option is not acceptable to the network, the network will propose a different service option and send a message to the mobile telephone with the different proposed service option. The mobile telephone will typically check the different service option proposed by the network against the list of service options received from the R-UIM in the capability configuration parameters. See block 110. If the service option proposed by the network is in the list received from the R-UIM, see block 112, the mobile telephone may accept the service option and a call will be established using this service option. See block 114. Alternatively, if the service option proposed by the network is in the list received from the R-UIM but the proposed service option is near or at the bottom of the list (i.e., the service option proposed by the network is one of the least preferable service options) and other more preferable service options have not been negotiated between the mobile telephone and the network, the mobile telephone may propose one of the more preferable service options (for example, the most preferable service option that has not yet been proposed) rather than immediately accepting a less preferable service option. This alternative option is not illustrated in FIG. 3.

If the service option proposed by the network is not in the list received from the R-UIM, then it will typically be determined whether any unproposed service options remain on the list received from the R-UIM. See block 116. If all of the service options on the list received from the R-UIM have been proposed by the mobile telephone but none of the proposed service options have been acceptable to the network, then the call attempt will be terminated in failure. See block 118. If there are service options remaining on the list that have not yet been proposed to the network, the mobile telephone will then propose the next service option on the list. See block 120. The steps depicted in blocks 106 through 120 will typically continue to be executed until either an acceptable service option has been agreed upon by the mobile telephone and the network (resulting in establishment of the call) or all of the service options have been proposed but all were unacceptable (resulting in termination). However, the network may terminate the negotiation process at any time by rejecting a proposed service option from the mobile telephone, whereby the mobile telephone will inform the R-UIM of the failure of call setup.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
   at least one processor; and
   at least one memory including computer program code, the at least one memory and the computer program code configured to, with the at least one processor cause the apparatus to perform at least the following:
   receive a call setup command, conforming to a code division multiple access card application toolkit standard, requesting initiation of a communication session;
   receive an ordered list of service options, each service option defining one acceptable configuration of the requested communication session,
   wherein the call setup command and the ordered list are received from a removable user identity module; and
   provide for negotiation with a wireless network to initiate the requested communication session, by providing for a proposal to the wireless network of a service option from the ordered list.

2. The apparatus of claim 1, wherein the computer program code further causes the apparatus to initiate the requested communication session in response to the wireless network accepting the proposed service option.

3. The apparatus of claim 1, wherein the computer program code further causes the apparatus to initiate the requested communication session when a counter-proposed service option from the wireless network is contained within the ordered list.

4. The apparatus of claim 1, wherein the computer program code further causes the apparatus to terminate communication between the processor and the wireless network when the processor and the wireless network cannot agree on a service option contained within the ordered list.

5. The apparatus of claim 1, embodied in a mobile telephone.

6. A method comprising:
   receiving a call setup command, conforming to a code division multiple access card application toolkit standard, requesting initiation of a communication session;
   receiving of an ordered list of service options, each service option defining one acceptable configuration of the requested communication session; and
   providing for negotiation with a wireless network to initiate the requested communication session by providing for proposal to the wireless network of a service option from the ordered list,
   wherein receiving the call setup command comprises receiving the call setup command from a removable user identity module and receiving the ordered list comprises receiving the ordered list from the removable user identify module.

7. The method of claim 6, further comprising:
   initiating the requested communication session in response to the wireless network accepting the proposed service option.

8. The method of claim 6, further comprising:
   initiating the requested communication session when a counter-proposed service option from the wireless network is contained within the ordered list.

9. The method of claim 6, further comprising:
   terminating communication with the wireless network when an agreement on a service option contained within the ordered list cannot be negotiated between the wireless network and an apparatus.

* * * * *

UNITED STATES PATENT AND TRADEMARK OFFICE
CERTIFICATE OF CORRECTION

PATENT NO.        : 7,996,041 B2
APPLICATION NO.   : 11/279304
DATED             : August 9, 2011
INVENTOR(S)       : Cheng It is certified that error appears in the above-identified patent and that said Letters Patent is hereby corrected as shown below:

Column 10,
Lines 21 and 22, "user identify" should read --user identity--.

Signed and Sealed this
Second Day of October, 2012

David J. Kappos
*Director of the United States Patent and Trademark Office*